Dec. 25, 1945.                M. WATTER                    2,391,662
                           AIRCRAFT STRUCTURE
                         Filed March 12, 1943        5 Sheets-Sheet 1
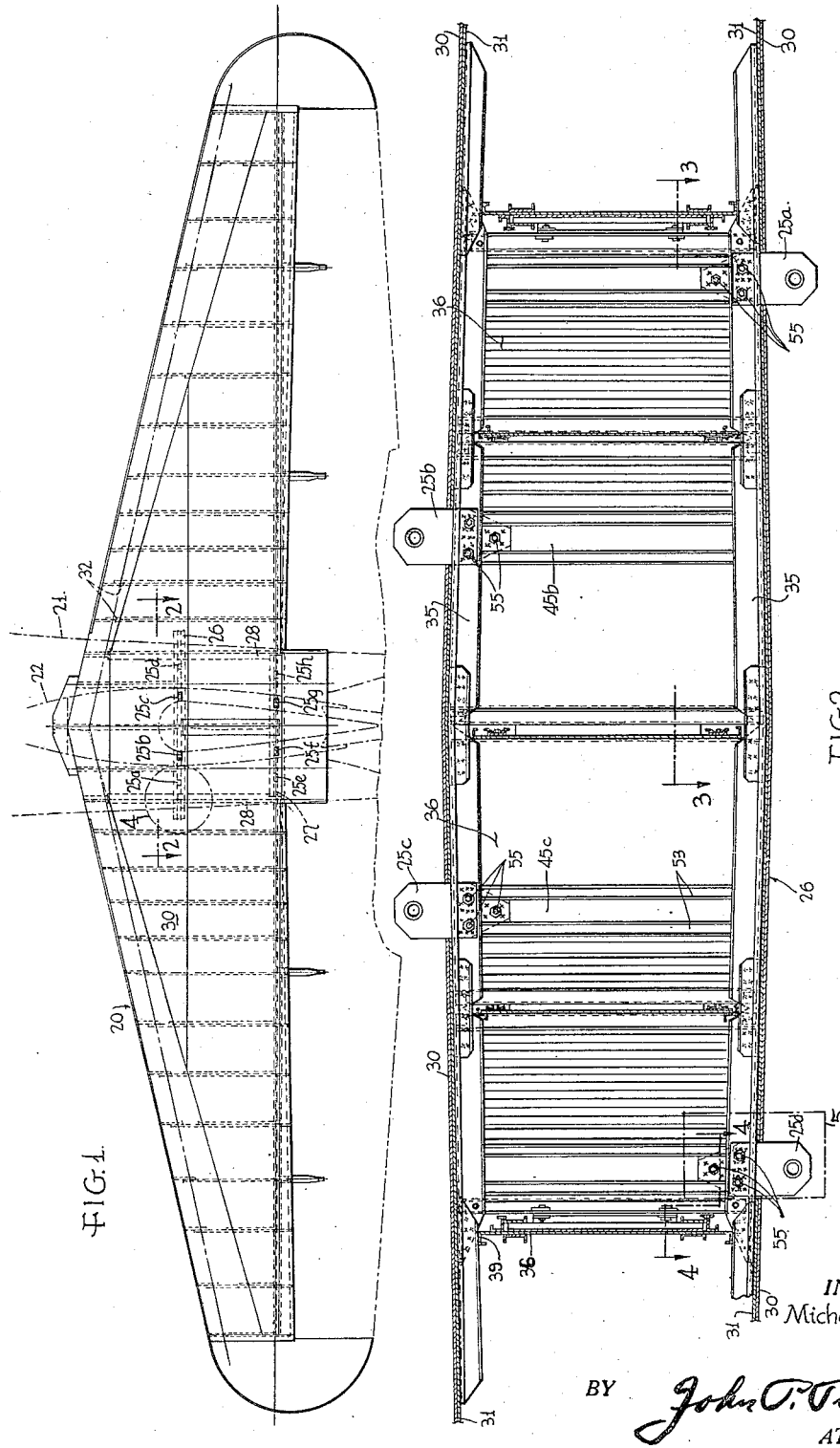
INVENTOR
Michael Watter
BY John T. Taulx
ATTORNEY

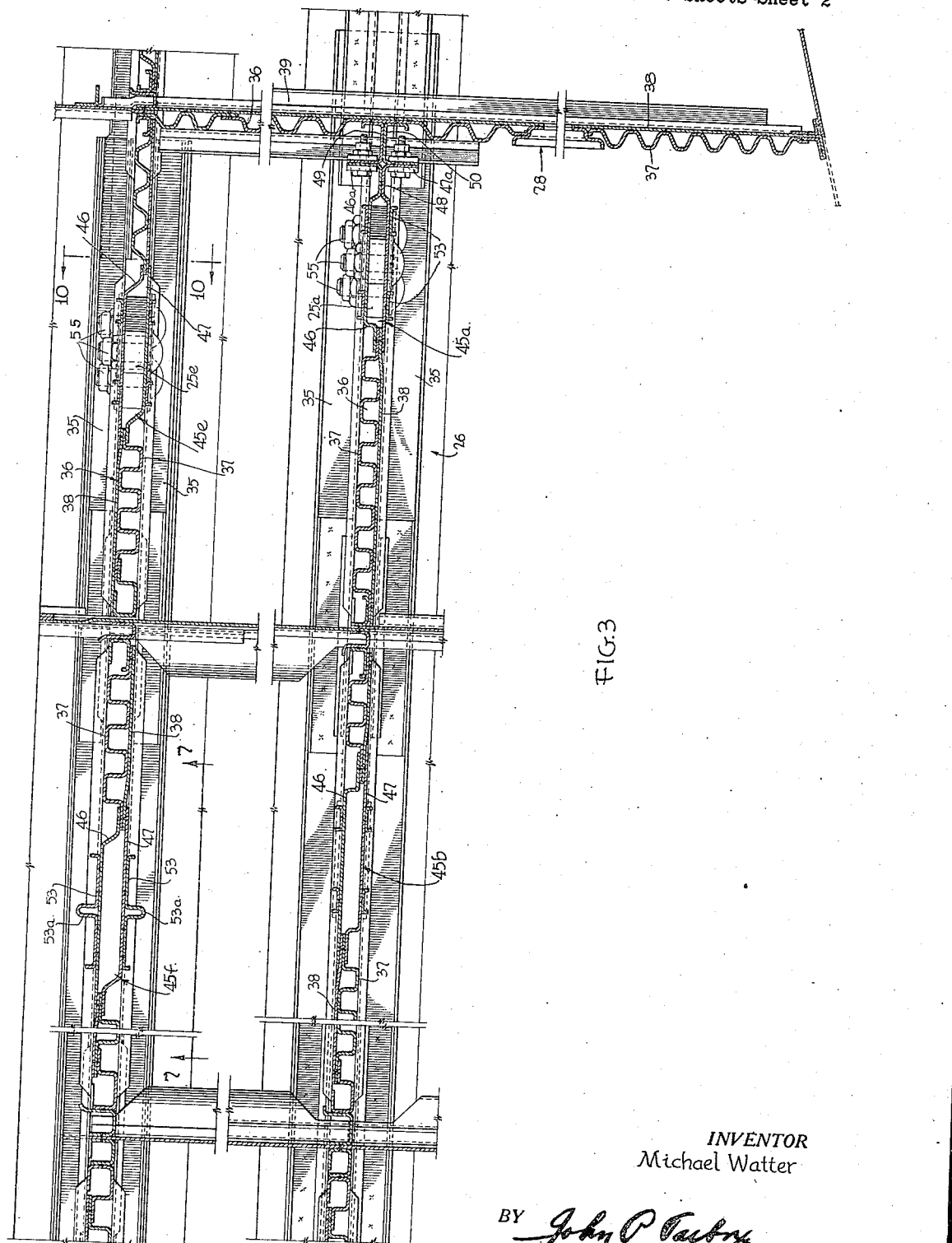

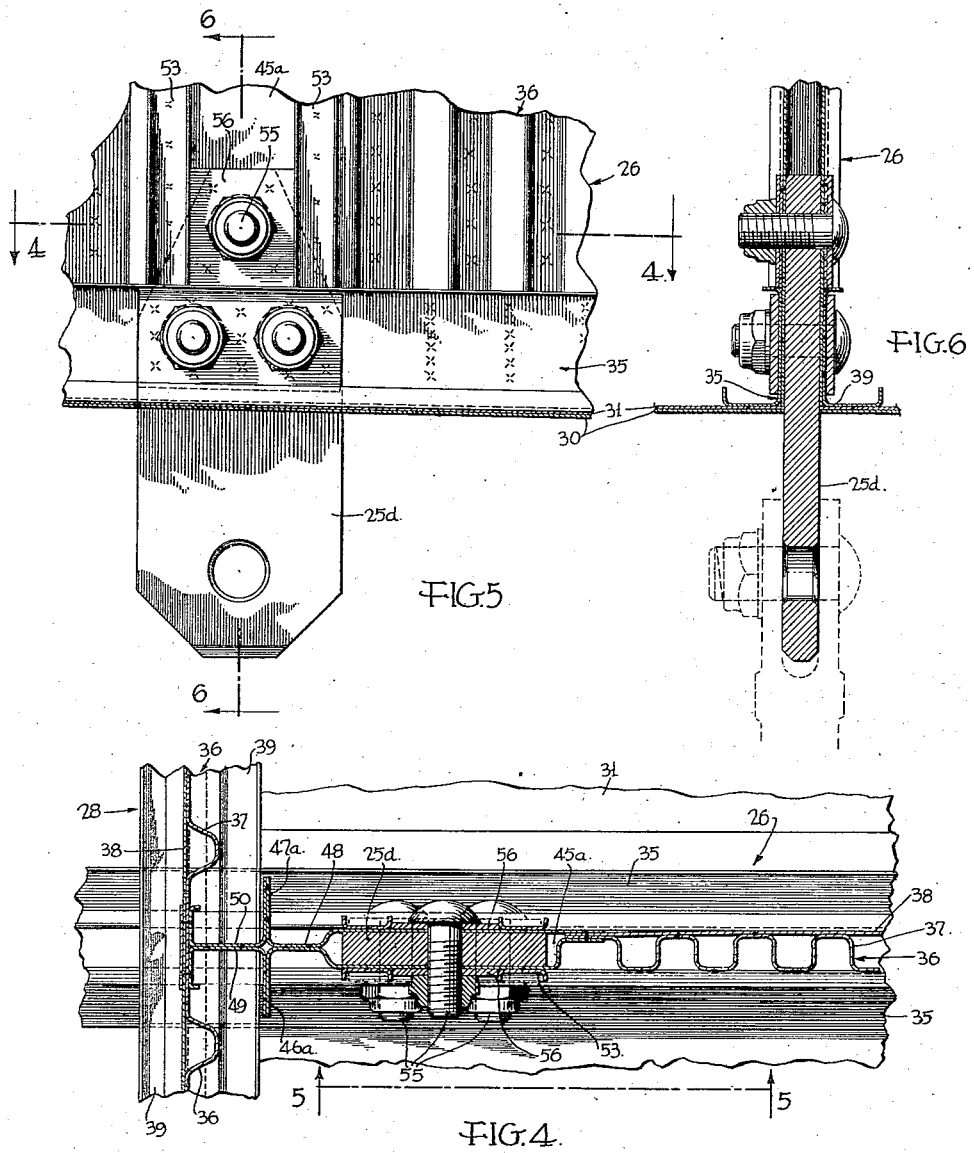

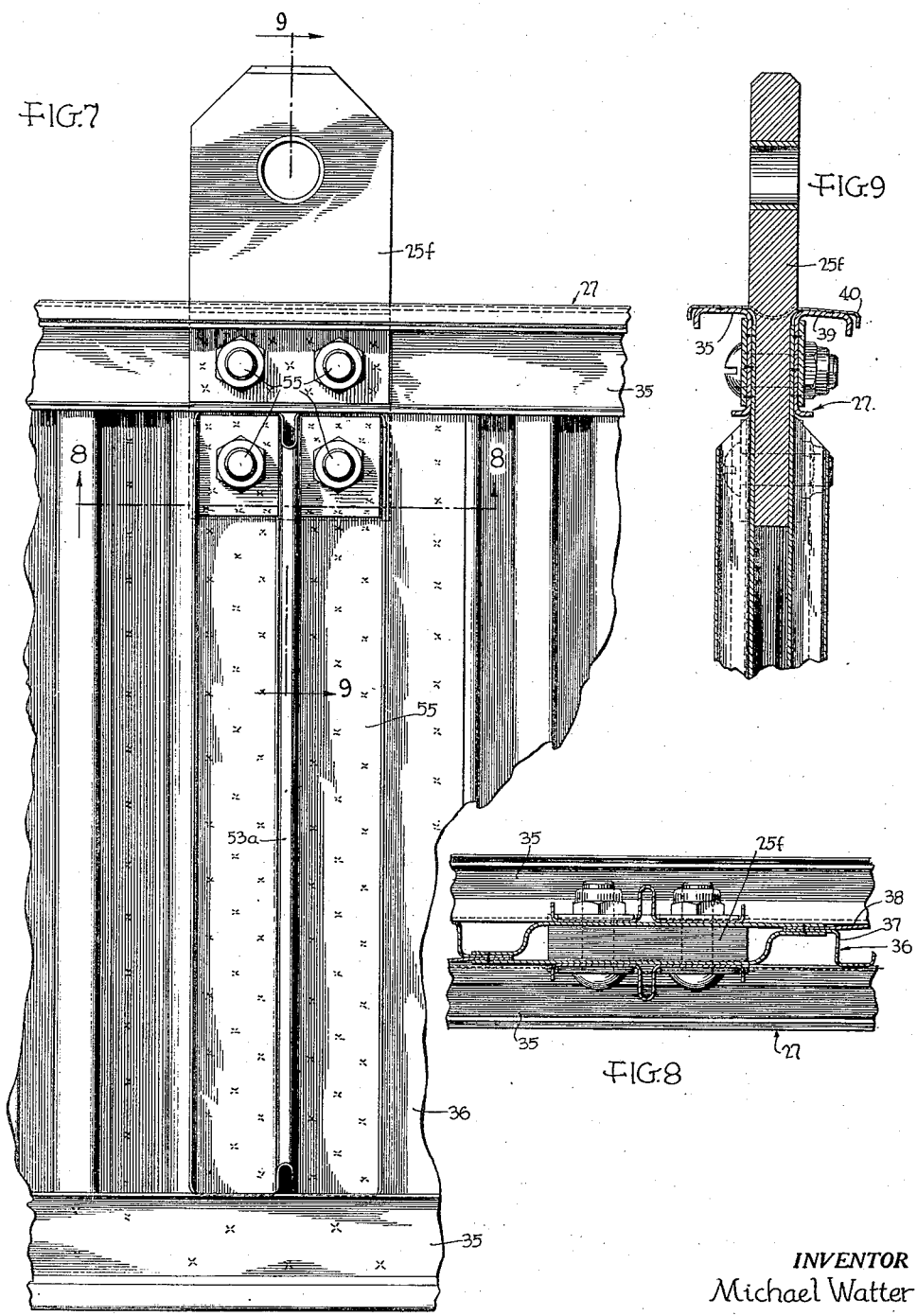

Dec. 25, 1945.    M. WATTER    2,391,662
AIRCRAFT STRUCTURE
Filed March 12, 1943    5 Sheets-Sheet 5
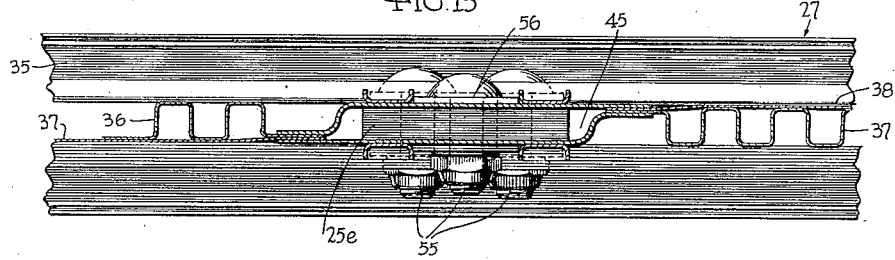
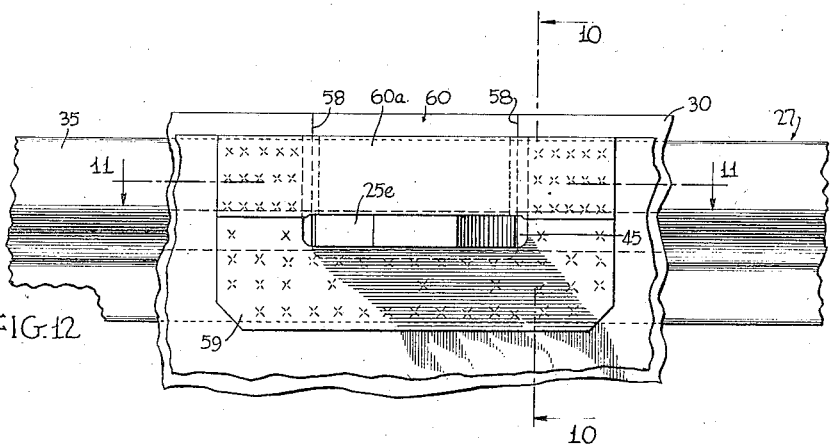
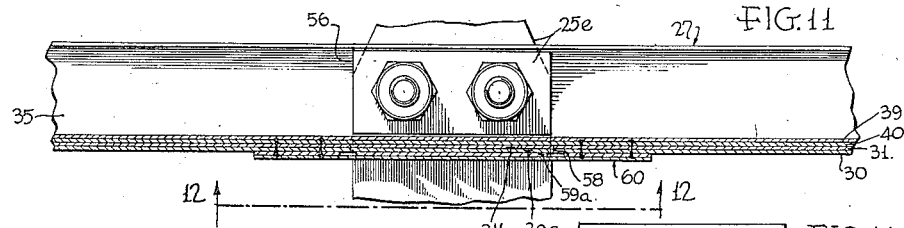
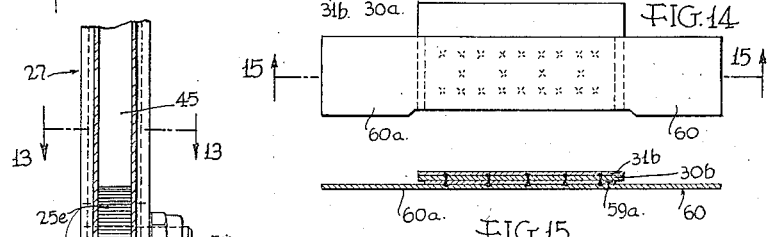
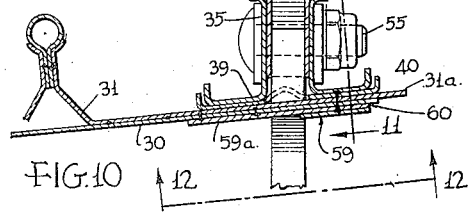
INVENTOR.
Michael Watter
BY John P. Tarbox
ATTORNEY.

Patented Dec. 25, 1945

2,391,662

UNITED STATES PATENT OFFICE 2,391,662

AIRCRAFT STRUCTURE

Michael Watter, Philadelphia, Pa., assignor to Edward G. Budd Manufacturing Company, Philadelphia, Pa., a corporation of Pennsylvania Application March 12, 1943, Serial No. 478,870

11 Claims. (Cl. 244—117)

This invention relates to airfoil anchorages adapted to secure an airfoil to a body which it crosses, as for example the crossing of an airfoil with a fuselage, or to secure one airfoil to another, as for example a tail fin to a horizontal stabilizer, and has for an object the provision of improvements in this art.

One of the particular objects of the invention is to provide an airfoil in which its anchorage elements are internally connected to the airfoil frame members and extend outward through the outer surface convenient for access during attachment of the airfoil to related parts. Another object is to provide in the airfoil frame, as an integrated part thereof, a portion of the anchorage structure, thereby strengthening the frame without unduly increasing its weight and at the same time providing a strong anchorage construction. And yet another object is to provide such an anchorage which assists in connecting one airfoil frame member to another.

The above mentioned and other objects and advantages of the invention will be evident from the following description of an exemplary embodiment thereof, reference being made to the accompanying drawings, wherein:

Fig. 1 is a face view of an airfoil embodying the invention, the particular view being a top plan of a horizontal stabilizer fin which is provided with anchorages for attaching it to the rear end of a fuselage and also for attaching to it the fin of a vertical stabilizer;

Fig. 2 is an enlarged vertical section taken approximately on the line 2—2 of Fig. 1 and showing an intermediate or false spar of the airfoil frame in side elevation;

Fig. 3 is an enlarged horizontal section taken approximately on the line 3—3 of Fig. 2, but showing certain adjacent frame parts which do not appear in Fig. 2;

Fig. 4 is a broken enlarged section taken about on the line 4—4 of Fig. 2, the section also being considered as an enlarged section taken at about the dotted circle 4 of Fig. 1, and also 4—4 of Fig. 5;

Fig. 5 is an enlarged side elevation taken about in the dotted line area 5 of Fig. 2, the view also being an enlarged side elevation of a portion of Fig. 4 from the line 5—5 thereof;

Fig. 6 is a vertical section taken on the line 6—6 of Fig. 5;

Fig. 7 is a vertical elevation taken on the line 7—7 of Fig. 3, showing also certain parts which are located above the plane of Fig. 3, hence not shown in that figure;

Fig. 8 is a horizontal section taken on the line 8—8 of Fig. 7;

Fig. 9 is a vertical section taken on the line 9—9 of Fig. 7;

Fig. 10 is an enlarged vertical section taken about on the line 10—10 of Fig. 3, the section also being shown on Fig. 12;

Fig. 11 is a vertical section taken on the line 11—11 of Figs. 10 and 12;

Fig. 12 is a bottom plan view looking upward from the line 12—12 shown on Figs. 10 and 11;

Fig. 13 is a horizontal section taken on the line 13—13 of Fig. 10;

Fig. 14 is a plan view similar to Fig. 12 but showing a filler piece before it is secured in the assembly; and Fig. 15 is a section taken on the line 15—15 of Fig. 14.

Referring to Figs. 1 to 3, an airfoil, such as a horizontal stabilizer 20, crosses over and is attached beneath to the rear end of a fuselage 21, shown in dot and dash lines. Thereabove it supports and is attached to a vertical fin 22, also shown in dot and dash lines. The attachment of the stabilizer to both fuselage and fin is made through lugs 25 which are integrated with the frame of the stabilizer. More particularly, four of the lugs 25a, 25b, 25c and 25d are associated with a stub or false spar 26 and four others 25e, 25f, 25g, and 25h are associated with a rear spar 27. The false spar 26 is connected into the frame by shear ribs 28, which transfer a portion of the stresses from the leading edges of the structure to the false spar 26. The bottom lugs 25a, 25d, 25e, and 25h are located near the shear ribs 28, and the upper lugs 25b, 25c, 25f, and 25g are located interiorly where they will enter the narrow frame of the vertical fin. The lugs 25a, 25b, 25c, and 25d of the false spar are inserted through the cover or skin 30 of the airfoil as for example after the skin blankets including the skin 30 and stringers 31 (one of which is shown in Fig. 10) have been secured on the ribs 32, shear ribs 28, and false spar 26 of the frame; and the lugs 25e, 25f, 25g, and 25h of the rear spar are pushed forward into notches in the rear edges of the skin when the rear spar on which they are mounted is assembled into place between the rear edges of the two skin blankets. All of the anchorage lugs are secured in protruding position when the stabilizer fin 20 is assembled and ready for attachment to the fuselage 21 and the vertical fin 22.

As shown in Figs. 3, 4, 5, and 6, the front or false spar 26 includes caps or chords 35 and a web 36; and as shown in Figs. 3, 7, 8, and 9, the rear spar 27 likewise includes chords or caps 35 and a web 36. The web 36 is vertically corrugated, being formed by a corrugated panel 37 welded to a flat panel 38, and the caps or chords comprise spaced flanged angle-shaped cap strips 39 and a cap plate 40. As shown in Figs. 2, 3, and 4, the shear ribs 28 likewise are formed of angle-shaped cap strips 39 and a web 36 comprising corrugated panels 37 and flat panels 38. From Figs. 2 and 3 it may be seen how the rib and spar members are assembled with the rib elements extending through the spar webs, also how the parts are secured together; but this is not a part of the present invention and need not be described in detail here.

In Fig. 3 it can be seen that where the anchorage lugs 25 are located the spar webs 36 are altered to form sockets 45 for receiving the ends or tangs of the lugs. These sockets are designated as 45a to 45h inclusive to correspond to the lugs 25a to 25h. In general scheme, every socket is alike in that it is formed from spaced panels 46 and 47 which form a continuation of the web 36; but there are small variations from the typical in some of the sockets and these variations will be described.

As shown in Fig. 3 which shows the sockets on one side, those on the other side being reverse duplicates, all of the sockets except 45a and 45d near the ends of the false spar 26 are formed by offsetting the opposite ends of the socket panels 46 and 47 respectively until they lie alongside the straight ends of the companion panels. These panel ends are welded together with the ends of the panels 37 and 38 of the spar webs. In the specific form illustrated the spar panel ends are disposed between the ends of the socket panel ends. There is thus a joint at diagonal corners of the socket at opposite sides of the web.

At the ends of the false spar, see also Fig. 4, the socket panels 46 and 47 are both offset to meet at the web center, where they are welded together to form a flat panel 48; and therebeyond they are turned laterally to form flanges 46a, 47a. The panel 48 and the out-turned flanges 46a and 47a together form a T-sectioned member which is adapted to be welded through the head flanges to a mating T-sectioned member which may be formed by welding channel-sectioned elements 49, 50 through their facing stem webs, the base flanges of these channel-sectioned elements 49, 50 being welded to the ends of the panels 37, 38 of the associated shear rib. It is not important here to consider any further details of this connection of the spar to the shear rib.

The panels 46 and 47 of all the sockets 45a to 45h are strengthened by vertical reinforcing members 53. As shown in Fig. 3 the reinforcing members 53 of all sockets except 45f and 45g of the rear spar consist of laterally spaced channel-sectioned elements which are welded through their backs or webs to the panels 46, 47. The reinforcing members 53 of the sockets 45f and 45g are wider than the others to cover the whole outer surface of a panel 46 or 47 by a single member, this member being formed with side flanges and a center rib or corrugation 53a. As shown in Figs. 2 and 7, the reinforcing members 53 extend the full distance between the vertical flanges of upper and lower cap strips 39.

The lugs 25 are secured in their sockets by bolts 55. At the sockets 45f and 45g Figs. 7 and 8, there are two bolts through the web panels 46 and 47 and the reinforcing strips 53 thereover, one on each side of the ribs 53a; and at all other joints Figs. 4 and 5, there is one bolt 55 through the web panels 46 and 47 between the reinforcing strips 53. At all sockets there are two bolts 55 through the cap strips 39. Also in all cases rectangular backing plates or washers 56 are placed on the bolts beneath their heads and nuts.

As shown in Figs. 10 to 15, the skin 30 and the rear flange 31a of a stringer 31 are cut away at the lug positions to form recesses 58, and rearwardly recessed reinforcing plates 59 are secured to the skin in front and on the sides of these recesses. After the lugs 25 have been pushed up into the recesses 58 the space behind each lug is closed by a filler piece 60 which is formed of an outer reinforcing plate 60a, a second plate 59a adapted to complete the reinforcing plate 59, a plate 30a adapted to fill the recess cut in the skin 30, and an inner plate 31b adapted to fill the recess in the stringer flange 31a. The plates forming the filler piece 60 are welded together before it is inserted in the recess and the protruding ends of the outer plate 60a are welded to the underlying sheets of material after assembly to hold the filler piece in position.

It is thus seen that the invention provides a very convenient and dependable anchorage for an airfoil. The projecting lugs are readily accessible for bolting to associated parts of the fuselage or tail fin; and the sockets for the lugs in the airfoil spars not only form strong sections of the web where the normal corrugated web is interrupted to receive the lugs, but also constitute an efficient means for the transfer of shear stresses to or from the bodies of the spars at points inward of the chord members thereof. The filler pieces complete the skin surface and reinforce the skin where it is recessed to receive the lugs of the rear spar. And the construction assists in the assembly of the airfoil.

While one embodiment of the invention has been illustrated and described it is to be understood that the invention may have various embodiments within the limits of the prior art and the scope of the subjoined claims.

I claim:

1. In an airfoil anchorage construction, the combination of an airfoil frame member which includes a web and cap strips secured to each side thereof, the web including spaced panels and the cap strips being spaced apart and secured to each side of the web to form a socket to receive the tang of an anchorage member extending thereinto through the airfoil surface, an anchorage member having a tang disposed in said socket, said panels including transverse walls enclosing the ends of said socket opening, reinforcing strips secured to the sides of said panels, and bolts extending through said panels and cap strips securing said anchorage member in said socket.

2. An airfoil anchorage construction as set forth in claim 1, further characterized by the fact that the end walls of the socket are formed of offsets in each socket-forming panel extending to a flat portion of the opposite panel, and joints at the lapped ends at diagonal corners of the socket opening between the socket-forming panels and the panels of the web.

3. An airfoil anchorage construction as set forth in claim 1, further characterized by the fact that said web on one side of a socket opening is formed of a corrugated panel and a flat panel which are lapped at one corner of the socket opening and welded to the lapped ends of the socket-forming panels.

4. An airfoil anchorage construction as set forth in claim 1, further characterized by the fact that said web on both sides of a socket opening is formed of a corrugated panel and a flat panel which are lapped respectively at diagonal corners of the socket opening and welded to the lapped ends of the socket-forming panels.

5. An airfoil anchorage construction as set forth in claim 1, further characterized by the fact that said web on one side of a socket opening is formed of a corrugated panel and a flat panel which are lapped at one corner of the socket opening and welded to the lapped ends of the socket-forming panels, and that on the other side of the socket opening the socket-forming panels are secured together in a lap at the median plane of the socket opening and web.

6. An airfoil anchorage construction as set forth in claim 1, further characterized by the fact that said socket-forming panels on one side of the socket opening are offset and lapped and welded together on the median plane of the socket opening and web and that the panels are bent outward beyond the welded portion to form a T-head for attachment to adjacent parts.

7. In an airfoil anchorage construction, the combination of an airfoil frame member which includes a corrugated web and cap strips secured to each side thereof, the cap strips being spaced apart and the web at an anchorage point being formed of spaced panels forming with the cap strips a socket to receive the tang of an anchorage member extending outward through the airfoil skin, the airfoil skin at one edge having a recess from the edge to receive the outer end of the anchorage member, a multi-layer insert member adapted to be fitted in said recess behind the anchorage member and welded to the skin and a flange of a cap strip, and surface reinforcing plates on said skin and said insert member around the anchorage member.

8. In an airfoil, the combination with a spanwise extending spar member of an attachment lug for anchoring the airfoil to an associated aircraft member, said spar member comprising spaced chord members and an interconnecting web structure, said web structure having a portion of hollow box-like cross section extending between said chord members, and said attachment lug having an attaching portion extending into said hollow portion between the walls thereof and an anchoring portion extending outwardly away from one of said chord members together with means for rigidly attaching said attaching portion to said one chord member and the walls of said hollow portion.

9. In an airfoil structure, a spanwise extending beam comprising spaced chord members, each embodying laterally spaced elements, structural means interconnecting said chord members, secured to said spaced elements and having at spaced regions portions of hollow box-like cross section extending from one chord member to the other and opening through the spaces between said spaced elements, beam anchoring lugs extending between the spaced elements of one of said chord members into said hollow portions in engagement with opposite walls thereof, and means for rigidly securing each of said lugs to the spaced elements of said one chord member and to the hollow portion into which it extends, said lugs projecting outwardly away from said one chord member for anchoring the airfoil to an aircraft member.

10. In an airfoil anchorage construction, the combination of a skin covered airfoil having a frame member which includes a transversely disposed box socket extending to the outside of the airfoil through the skin, an anchorage member disposed in the socket and extending laterally beyond the surface of the airfoil, the box socket extending substantially the full width of the frame member and having side walls surrounding the anchorage member on all sides and closely embracing it on at least two sides, and shear means for securing one end of the anchorage member to said frame member within said socket.

11. In an airfoil anchorage construction, the combination of a skin covered airfoil having a frame member which includes a web and a cap strip secured to a side thereof through a parallel side, said frame member being provided with a transversely disposed box socket extending to the outside of the airfoil through the skin, an anchorage lug disposed in said socket alongside the web and the side of the cap strip which is parallel thereto, the box socket extending inwardly beyond the cap strip and having side walls surrounding the anchorage lug on all sides and closely embracing it on at least two sides, the lug extending laterally from the outside of the airfoil for attachment to an adjacent part, and shear means for securing the lug to the adjacent side of the cap strip.

MICHAEL WATTER.